(12) United States Patent (10) Patent No.: US 9,112,406 B2
Avci et al. (45) Date of Patent: Aug. 18, 2015

(54) HIGH EFFICIENCY CHARGE PUMP CIRCUIT

(71) Applicant: Dialog Semiconductor GmbH, Kirchheim/Teck-Nabern (DE)

(72) Inventors: Celal Avci, Istanbul (TR); Kemal Ozanoglu, Istanbul (TR); Serhan Eroz, Istanbul (TR); Emre Topcu, Istanbul (TR)

(73) Assignee: Dialog Semiconductor GmbH, Kirchheim/Teck-Nabern (DE)

( * ) Notice: Subject to any disclaimer, the term of this patent is extended or adjusted under 35 U.S.C. 154(b) by 0 days.

(21) Appl. No.: 14/316,926

(22) Filed: Jun. 27, 2014

(65) Prior Publication Data

US 2015/0102854 A1 Apr. 16, 2015

(30) Foreign Application Priority Data

Oct. 11, 2013 (EP) .................................... 13188374

(51) Int. Cl.
*H02M 3/07* (2006.01)
(52) U.S. Cl.
CPC ...................................... *H02M 3/07* (2013.01)
(58) Field of Classification Search
CPC ................................ H02M 3/07; H02M 3/073
USPC ......................................................... 327/536
See application file for complete search history.

(56) References Cited

U.S. PATENT DOCUMENTS

| 5,587,683 | A | | 12/1996 | Kawasaki et al. | |
|---|---|---|---|---|---|
| 6,046,626 | A | * | 4/2000 | Saeki et al. | 327/536 |
| 6,078,212 | A | * | 6/2000 | Lakhani | 327/536 |
| 6,172,886 | B1 | | 1/2001 | Lauterbach et al. | |
| 6,191,642 | B1 | * | 2/2001 | Nguyen | 327/536 |
| 6,661,682 | B2 | | 12/2003 | Kim et al. | |
| 6,677,806 | B2 | * | 1/2004 | Bloch | 327/536 |
| 6,970,035 | B2 | * | 11/2005 | Tanimoto | 327/536 |
| 6,975,161 | B2 | | 12/2005 | Yen | |
| 7,046,076 | B2 | | 5/2006 | Daga et al. | |
| 7,116,156 | B2 | * | 10/2006 | Myono et al. | 327/536 |
| 7,292,089 | B2 | | 11/2007 | Park et al. | |
| 7,893,753 | B2 | * | 2/2011 | Kimura | 327/537 |

(Continued)

OTHER PUBLICATIONS

European Search Report 13188374.6-1809 Mailed Mar. 19, 2014, Dialog Semiconductor GmbH.
"On-Chip High-Voltage Generation in MNOS Integrated Circuits Using an Improved Voltage Multiplier Technique," by John F. Dickson, IEEE Journal of Solid-State Circuits, vol. SC-11, No. 3, Jun. 1976, pp. 374-378.

(Continued)

*Primary Examiner* — Thomas J Hiltunen
(74) *Attorney, Agent, or Firm* — Saile Ackerman LLC; Stephen B. Ackerman

(57) ABSTRACT

The present document relates to charge pump voltage doublers for use in integrated circuits. A charge pump circuit configured to generate an output voltage Vout at an output of the circuit from an input voltage Vin at an input of the circuit is described. The circuit further comprises a boosting capacitor coupled at a first side to the output node of the first P-type switch and coupled at a second side to a capacitor control signal. Furthermore, the circuit comprises control circuitry configured to provide a capacitor control-signal-which alternates between a low level and a high level, and configured to generate first and second control signals based on the capacitor control signal for alternating the first and second P-type switches between on-states and off-states, respectively, such that electrical energy is transferred from the input to the output of the circuit using the boosting capacitor.

22 Claims, 5 Drawing Sheets

(56) References Cited

U.S. PATENT DOCUMENTS

| | | | |
|---|---|---|---|
| 8,106,703 B2* | 1/2012 | Nagai et al. | 327/536 |
| 8,120,413 B2* | 2/2012 | Li et al. | 327/536 |
| 2005/0088220 A1* | 4/2005 | Hahn et al. | 327/536 |
| 2006/0006925 A1* | 1/2006 | Yamazoe et al. | 327/536 |
| 2007/0075765 A1 | 4/2007 | Kawagoshi | |
| 2009/0167419 A1 | 7/2009 | Sakaguchi | |
| 2013/0051583 A1* | 2/2013 | Gueorguiev | 381/111 |
| 2013/0207716 A1* | 8/2013 | Lee et al. | 327/536 |

OTHER PUBLICATIONS

"A New Charge Pump Without Degradation in Threshold Voltage Due to Body Effect," by Jongshin Shin, et al., IEEE Journal of Solid-State Circuits, vol. 35, No. 8, Aug. 2000, pp. 1227-1230.

"A High-Efficiency CMOS Voltage Doubler," by Pierre Fabrat, et al., IEEE Journal of Solid-State Circuits, vol. 33, No. 3, Mar. 1998, pp. 410-416.

* cited by examiner

HIGH EFFICIENCY CHARGE PUMP CIRCUIT

TECHNICAL FIELD

The present document relates to charge pump voltage doublers for use in integrated circuits. More particularly, the present document relates to charge pump voltage doublers with low input voltage, high efficiency and minimum off-chip components.

BACKGROUND

Charge pump voltage doubler circuits are a building block of integrated circuits providing an output voltage higher than the power supply voltage. The trend for lower power supply voltages at the input of integrated circuits (e.g. in the context of single battery operation) and the trend for flexible operating conditions (e.g. in the context of wide input power supply range integrated circuits) are resulting in more applications for charge pump voltage doublers and creates the need for new design topologies performing with relatively low input voltages and with increased power efficiency.

Charge pump voltage doublers may require two boosting capacitors per doubling stage. Furthermore, charge pump voltage doublers may only be operable for input voltages which are substantially higher than the threshold voltage of transistors comprised within the voltage doublers. In addition, charge pump voltage doublers may make use of triple well CMOS (Complementary metal oxide semiconductor) technology, thereby increasing the cost of the voltage doubler. Furthermore, charge pump voltage doublers may suffer from substantial power losses.

The present document addresses the above mentioned technical problems. In particular, the present document describes a charge pump voltage doubler topology with high power efficiency, which uses only a single boosting capacitor per doubler stage and which may operate with relatively low input supply voltages. The charge pump voltage doubler which is described in the present document may be implemented using a standard CMOS process, without the need of using the relatively cost intensive triple well CMOS process.

SUMMARY

According to an aspect, a charge pump circuit (e.g. a voltage doubler circuit) configured to generate an output voltage Vout at an output of the charge pump circuit from an input voltage Vin at an input of the charge pump circuit is described. A level of the output voltage Vout may be greater than a level of the input voltage Vin. In particular, the level of the output voltage Vout may be approximately two times the input voltage Vin, e.g. 1.9 or more times the input voltage Vin. The input of the circuit may be coupled to a power supply providing electrical energy at the input voltage Vin to the charge pump circuit. The charge pump circuit may be implemented as an integrated circuit, using e.g. CMOS technology.

The charge pump circuit comprises a first P-type switch comprising an input node (e.g. a drain) and an output node (e.g. a source). The P-type switch may comprise or may be a P-type metal oxide semiconductor (MOS) transistor. The input node of the first P-type switch is (directly) coupled to the input of the charge pump circuit. The use of a P-type switch is beneficial, as P-type switches typically exhibit no or reduced body effects, thereby allowing for the implementation of a charge pump circuit exhibiting an increased power efficiency.

The charge pump circuit further comprises a boosting capacitor which is (directly) coupled at a first side to the output node (e.g. the source) of the first P-type switch and which is (directly) coupled at a second side to (or submitted to) a capacitor control signal. The boosting capacitor may be responsible for transferring electrical energy from the input to the output of the charge pump circuit. Furthermore, the boosting capacitor may be used to boost the output voltage with respect to the input voltage. The boosting capacitor may be external to an integrated circuit implementing the charge pump circuit. In such cases, the boosting capacitor may be coupled to the integrated circuit via a pair of pins of the integrated circuit.

The charge pump circuit further comprises a second P-type switch comprising an input node (e.g. a drain) and an output node (e.g. a source). The P-type switch may comprise or may be a P-type metal oxide semiconductor (MOS) transistor. The input node of the second P-type switch is (directly) coupled to the output node of the first P-type switch, and the output node of the second P-type switch is (directly) coupled to the output of the charge pump circuit. As such, the first and second P-type switches may be used to couple the boosting capacitor with the input of the charge pump circuit and/or with the output of the charge pump circuit, respectively.

In addition, the charge pump circuit comprises control circuitry configured to provide the capacitor control signal, wherein the capacitor control signal alternates between a low level and a high level. The capacitor control signal may alternate at a pre-determined commutation cycle rate or frequency, e.g. at 1 MHz or more. The high level of the capacitor control signal may correspond to the level of the input voltage Vin. The low level of the capacitor control signal may correspond to a level which is lower than the level of the input voltage Vin (e.g. the level of ground). As such, the level of the boosting capacitor may be shifted between the low level and the high level, in order to provide an output voltage Vout which is increased compared to the input voltage Vin.

The control circuitry is configured to generate first and second control signals based on the capacitor control signal for alternating the first and second P-type switches between on-states (when a switch is closed) and off-states (when a switch is open), respectively. The first and second control signals may be applied to gate nodes of the first and second P-type switches, respectively. The first and second control signals may be generated such that electrical energy is transferred from the input to the output of the circuit using the boosting capacitor. In particular, the first and second control signals may be generated such that the boosting capacitor is coupled to the input and the output of the charge pump circuit in a mutually exclusive manner and/or in an alternating manner. For this purpose, the first and second control signals may be generated to be in synchronicity with the capacitor control signal.

As outlined above, the charge pump circuit makes use of P-type switches, thereby providing a power efficient charge pump circuit. Furthermore, the use of P-type switches enables relatively low input voltage Vin. In addition, the charge pump circuit makes use of only a single boosting capacitor for transferring the electrical energy from the input to the output of the charge pump circuit. By doing this, the number of pins (and consequently the costs) of the charge pump circuit can be reduced.

The control circuitry may be configured to generate the first control signal, such that the first P-type switch is closed, when the capacitor control signal is at low level, to charge the boosting capacitor with electrical energy from the input of the circuit. This phase, when the boosting capacitor is coupled to the input of the charge pump circuit, may be referred to as a charging phase. Furthermore, the control circuitry may be configured to generate the first control signal, such that the first P-type switch is open, when the capacitor control signal is at high level. This phase, when the boosting capacitor is decoupled from the input of the charge pump circuit, may be referred to as a discharging phase.

In other wards, the first P-type switch may be closed to couple the boosting capacitor to the input voltage Vin, and to thereby bring the output node of the first P-type switch (i.e. the first side of the boosting capacitor) to the level of the input voltage Vin. Furthermore, the first P-type switch may be opened to decouple the boosting capacitor. By modifying the level of the second side of the boosting capacitor (using the capacitor control signal), the level of the first side of the boosting capacitor may be shifted. The electrical energy which is stored within the boosting capacitor may then be provided to the output of the charge pump circuit at the shifted voltage level.

The control circuitry may comprise a high side switch and a low side switch, which are arranged in series between the output node of the first P-type switch and a reduced voltage level (e.g. ground). The high side and low side switches may be or may comprise MOS transistors. The high side switch may comprise a P-type switch, and/or the low side switch may comprise a N-type switch.

A midpoint between the high side switch and the low side switch may be coupled to the gate node of the first P-type switch. The high side switch and the low side switch may be used to generate the first control signal. In particular, the high and low side switches may be configured to generate a first control signal which alternates between a high level and a low level. For this purpose, the high side switch may be configured to couple the output node of the first P-type switch with the gate node of the first P-type switch, when the high side switch is closed, to open the first P-type switch. Furthermore, the low side switch may be configured to couple the gate node of the first P-type switch to ground, when the low side switch is closed, to close the first P-type switch.

The control circuitry may be configured to open and close the high side switch and the low side switch in a mutually exclusive manner, in order to open or close the first P-type switch. For this purpose, the gates nodes of the high side switch and of the low side switch may be coupled to an inverted version of the capacitor control signal, thereby controlling the first P-type switch in synchronicity with the capacitor control signal.

The control circuitry may further be configured to generate the second control signal, such that the second P-type switch is closed, during the discharging phase, when the capacitor control signal is at high level, to discharge the boosting capacitor towards the output of the charge pump circuit. Furthermore, the second control signal may be generated such that the second P-type switch is open, during the charging phase, when the capacitor control signal is at low level.

For this purpose, the control circuitry may comprise a control capacitor which is arranged between the gate node of the second P-type transistor (on a first side of the control transistor) and an inverted version of the capacitor control signal (which may be applied to a second side of the control transistor). As such, the control transistor may be used for boosting purposes, notably for boosting the voltage which is applied to the gate node of the second P-type transistor. However, the electrical energy which is taken up by the gate of the second P-type transistor is typically relatively small, such that the control transistor can be implemented on-chip.

Furthermore, the control circuitry may comprise a control switch arranged between a power supply and the gate node of the second P-type transistor. The power supply may be configured to provide electrical energy at the input voltage Vin. The control switch may be or may comprise an N-type switch, e.g. an N-type MOS transistor. The control switch may be configured to couple the gate node of the second P-type transistor to the power supply for charging the control capacitor and for closing the second P-type switch. Furthermore, the control switch may be configured to decouple the gate node of the second P-type transistor from the power supply for opening the second P-type switch. For this purpose, a gate node of the control switch may be coupled to the output node of the first P-type switch.

The charge pump circuit may comprise auxiliary switches (e.g. P-type MOS transistors) for bypassing parasitic diodes of the first and second P-type switches, respectively. By doing this, the power efficiency of the charge pump circuit may be further increased and/or the charge pump circuit may be used with further reduced input voltage Vin.

The charge pump circuit may further comprise an output capacitor in parallel to the output of the circuit for reducing modulations of the output voltage Vout.

According to another aspect, a method for generating an output voltage Vout at an output of a charge pump circuit from an input voltage Vin at an input of the charge pump circuit is described. A level of the output voltage Vout is typically greater than a level of the input voltage Vin. The input of the charge pump circuit may be coupled to a power supply which provides electrical power at the input voltage Vin. The method comprises providing a first P-type switch which comprises an input node and an output node. The input node of the first P-type switch may be coupled to the input of the charge pump circuit. Furthermore, the method comprises providing a boosting capacitor coupled at a first side to the output node of the first P-type switch and coupled at a second side to a capacitor control signal. In addition, a second P-type switch comprising an input node and an output node is provided. The method also comprises coupling the input node of the second P-type switch to the output node of the first P-type switch, and coupling the output node of the second P-type switch to the output of the charge pump circuit. In addition, the method comprises providing a capacitor control signal which alternates between a low level and a high level. The method also comprises generating first and second control signals based on the capacitor control signal for alternating the first and second P-type switches between on-states and off-states, respectively, such that electrical energy is transferred from the input to the output of the charge pump circuit using the boosting capacitor. According to a further aspect, a charge pump circuit is described, wherein the charge pump circuit configured to generate an output voltage Vout at an output of the circuit from an input voltage Vin at an input of the circuit, wherein a level of the output voltage Vout is greater than a level of the input voltage Vin; wherein the charge pump circuit comprises a first P-type switch comprising an input node and an output node; wherein the input node of the first P-type switch is coupled to the input of the circuit, a boosting capacitor coupled at a first side to the output node of the first P-type switch and coupled at a second side to a capacitor control signal, a second P-type switch comprising an input node and an output node; wherein the input node of the second P-type switch is coupled to the output node of the first P-type switch, and wherein the output node of the second P-type switch is coupled to the output of the circuit, and control circuitry configured to provide a capacitor control signal which alternates between a low level and a high level, and configured to generate first and second control signals based on the capacitor control signal for alternating the first and second P-type switches between on-states and off-states, respectively, such that electrical energy is transferred from the input to the output of the circuit using the boosting capacitor.

According to another aspect, a method is described, wherein a method for generating an output voltage Vout at an output of a charge pump circuit from an input voltage Vin at an input of the charge pump circuit, wherein a level of the output voltage Vout is greater than a level of the input voltage Vin, wherein the method comprises providing a first P-type switch comprising an input node and an output node, coupling the input node of the first P-type switch to the input of the circuit, providing a boosting capacitor coupled at a first side to the output node of the first P-type switch and coupled at a second side to a capacitor control signal, providing a second P-type switch comprising an input node and an output node, coupling the input node of the second P-type switch to the output node of the first P-type switch, coupling the output node of the second P-type switch to the output of the circuit, providing a capacitor control signal which alternates between a low level and a high level, and generating first and second control signals based on the capacitor control signal for alternating the first and second P-type switches between on-states and off-states, respectively, such that electrical energy is transferred from the input to the output of the circuit using the boosting capacitor.

It should be noted that the methods and systems including its preferred embodiments as outlined in the present document may be used stand-alone or in combination with the other methods and systems disclosed in this document. In addition, the features outlined in the context of a system are also applicable to a corresponding method. Furthermore, all aspects of the methods and systems outlined in the present document may be arbitrarily combined. In particular, the features of the claims may be combined with one another in an arbitrary manner.

In the present document, the term "couple" or "coupled" refers to elements being in electrical communication with each other, whether directly connected e.g., via wires, or in some other manner.

BRIEF DESCRIPTION OF THE DRAWINGS

The invention is explained below in an exemplary manner with reference to the accompanying drawings, wherein.

DESCRIPTION

Figure 1:
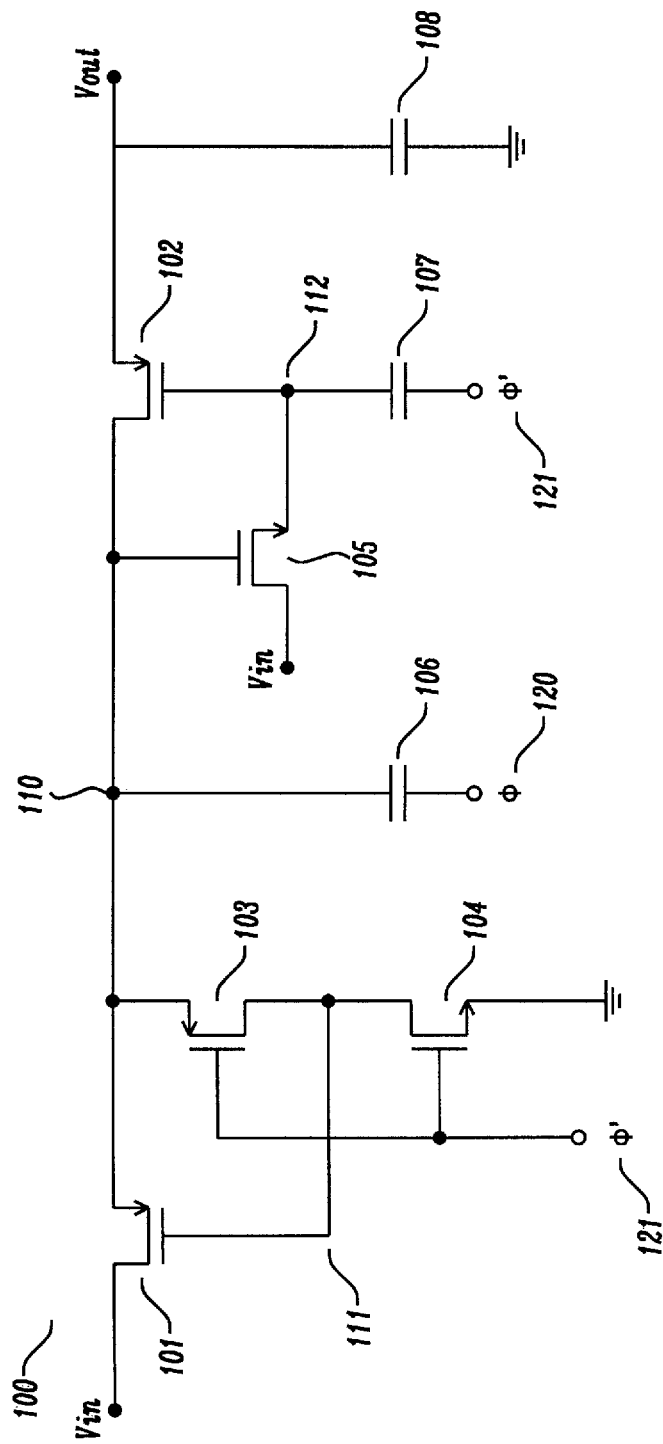
FIG. 1 illustrates a circuit diagram of an example single stage charge pump voltage doubler.

FIG. 1 shows a circuit diagram of an example single stage charge pump voltage doubler 100. The voltage doubler 100 comprises a first PMOS (P-type metal oxide semiconductor) switch transistor 101 which is arranged to charge a boosting capacitor 106, when the control signal Φ 120 (also referred to as the capacitor control signal) driving the boosting capacitor 106 is low. Typically, the control signal Φ 120 takes on values between 0V (low level) and the input voltage Vin (high level). The first transistor 101 (also referred to as the first P-type switch) is configured to couple the input voltage Vin to the boosting capacitor 106, during a time interval, when the control signal Φ 120 is at low level. On the other hand, the first transistor 101 is configured to decouple the input voltage Vin from the boosting capacitor 106, during a time interval, when the control signal Φ 120 is at high level.

During the phase (or time interval), when the control signal Φ 120 is at low level (and when the boosting capacitor 106 is being charged), a second PMOS switch transistor 102 is arranged to be off, in order to isolate the output voltage Vout from the node 110 connected to the boosting capacitor 106. This time interval may be referred to as the charging phase. When the control signal Φ 120, which is driving the boosting capacitor 106 is at high level, the node 110 connected to the boosting capacitor 106 has a voltage equal to two times the input voltage (i.e. 2×Vin), in the idealized case. This time interval may be referred to as the discharging phase. The second transistor 102 (also referred to as the second P-type switch) may be arranged to be on, during the time interval, when the control signal Φ 120 is at high level, thereby transferring the increased voltage (i.e. 2×Vin) to the output of the voltage doubler 100. During this phase, the first transistor 101 is turned off, thereby isolating the boosted voltage Vout from the input voltage Vin.

The voltage doubler 100 comprises control or support circuitry for the first and the second transistors 101, 102. The support circuitry for the first transistor 101 comprises a high side switch 103 (e.g. a PMOS transistor) and a low side switch 104 (e.g. an NMOS transistor). The high side switch 103 and the low side switch 104 may be connected in a similar manner as an inverter block. The high side switch 103 and the low side switch 104 may be controlled using an inverted control signal Φ' 121, wherein the inverted control signal Φ' 121 is an inverted version of the control signal Φ 120. When the control signal Φ' 121 driving the high side switch 103 and the low side switch 104 is at high level (equal to Vin), the low side switch 104 turns on and pulls down the gate voltage of the first transistor 101 to ground voltage. As a result of this, the first transistor 101 turns on (showing a relatively low resistance—$1/g_{ds}$ between its drain and source nodes). During the phase (i.e. the charging phase), when the inverted control signal Φ' 121 is at high level, the node 110 connected to the boosting capacitor 106 has a voltage substantially equal to Vin and the high side switch 103 is off, thereby decoupling the gate node 111 of the first transistor 101 from the source node of the first transistor 101.

In another phase (i.e. the discharging phase) the control signal Φ' 121 driving the inverter (i.e. driving the high side switch 103 and the low side switch 104) is low (equal to 0V) and the node 110 connected to the boosting capacitor 106 has a voltage equal to substantially 2×Vin. During this phase, the low side switch 104 is off, thereby decoupling the gate node 111 from ground. At the same time, the high side switch 103 is on, thereby charging the gate voltage of the first transistor 101 to 2×Vin, thus turning off the first transistor 101, and thereby decoupling the node 110 from the input voltage Vin.

The support circuitry for the second transistor 102 comprises a control switch 105 (e.g. an NMOS transistor) and a control capacitor 107. The control capacitor 107 is coupled to the gate node 112 of the second transistor 102 (at a first side) and to the inverted control signal Φ' 121 (at a second side). When the control signal Φ' 121 driving the control capacitor 107 is low (equal to 0V), the control transistor 105 turns on, because during this phase, the gate of the control transistor 105 (which is coupled to the node 110) has a voltage equal to 2×Vin. In the illustrated example, the drain of the control transistor 105 is coupled to the input voltage, and by consequence, the gate voltage of the second transistor (at node 112) is equal to the input voltage Vin, during the phase when the control signal Φ' 121 is low. During this phase (i.e. during the discharging phase), the source of the second transistor 102 has a voltage which is equal to 2×Vin, and consequently, the second transistor 102 is turned on.

On the other hand, when the control signal Φ' 121 driving the control capacitor 107 is high (equal to Vin), the gate voltage of the second transistor 102 (at node 112) is boosted to a voltage equal to 2×Vin. During this phase (i.e. during the charging phase), the source of the second transistor 102 has a voltage equal to the output voltage, i.e. two times the input voltage Vin, and the second transistor 102 is turned off. Furthermore, during this phase the control transistor 105 is off, because the gate of the control transistor (at node 110) has a voltage equal to the input Vin.

As such, the circuit 100 alternates charging phases and discharging phases and thereby transfers electrical energy from the input of the circuit 100 to the output of the circuit 100 using the boosting capacitor 106.

Figure 2:
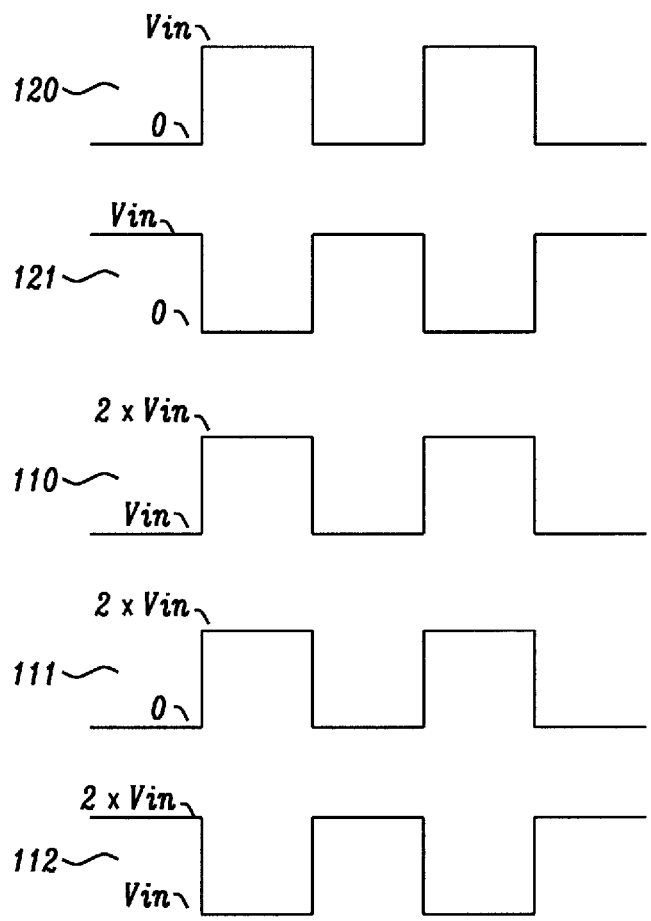
FIG. 2 shows an example capacitor control signaling scheme and example node voltages describing the operation of the charge pump voltage doubler stage of FIG. 1.

FIG. 2 shows example control signals 120, 121 and example voltages at the nodes 110, 111, 112 of the voltage doubler 100 of FIG. 1. It can be seen that the capacitor control signal 120 comprises alternating phases where the control signal 120 is at low level (e.g. 0V), referred to as the charging phases, and phases where the control signal 121 is at high level (e.g. Vin), referred to as the discharging phases. Typical commutation cycle rates are in the range of 1 MHz, wherein a commutation cycle comprises one phase where the control signal 120 is at low level and one phase where the control signal 120 is at high level. As can be seen in FIG. 2, the inverted control signal 121 is an inverted version of the control signal 120, such that the inverted control signal 121 is at low level, during a phase, when the control signal 120 is at high level, and vice versa.

FIG. 2 also illustrates the voltage levels at the nodes 110, 111, 112 of the voltage doubler 100 of FIG. 1, in response to the control signals 120, 121. As already outlined above, it can be seen that the (high side) node 110 of the boosting capacitor 106 alternates between the input voltage Vin (during a phase for which the first transistor 101 is on (i.e. closed)) and 2×Vin (during a phase for which the first transistor 101 is off (i.e. open)). The gate node 111 of the first transistor 101 alternates between 0V (in order to cause the first transistor 101 to be on (i.e. closed)) and 2×Vin (in order to cause the first transistor 101 to be off). The gate node 112 of the second transistor 102 alternates between Vin (in order to cause the second transistor 102 to be off) and 2×Vin (in order to cause the second transistor 102 to be on).

The voltage doubler 100 of FIG. 1 is beneficial in that it makes use of only a single boosting capacitor 106 for transferring electrical energy from the input of the voltage doubler 100 to the output of the voltage doubler 100. Hence, an integrated circuit comprising the voltage doubler 100 only requires two pins for connecting the external boosting capacitor 106. It should be noted that the control capacitor 107 and the output capacitor 108 typically have a relatively low capacitance and can therefore be implemented as part of the integrated circuit (i.e. on-chip). In contrast to the boosting capacitor 106, the output capacitor 108 and the control capacitor 107 are not involved in the transfer of electrical energy from the input to the output of the voltage doubler 100.

Furthermore, the voltage doubler 100 of FIG. 1 is beneficial, as it may be operable with relatively low input voltages Vin (e.g. in the range of 1V and smaller). This is due to the fact that the P-type transistors do not exhibit a significant body effect, which would reduce the voltage drop at the boosting capacitor 106 and the voltage drop at the output of the second transistor 102, and thereby reduce the level of the output voltage Vout that can be derived from the input voltage Vin. Furthermore the use of P-type transistors for the first and second transistors 101, 102 allows the power efficiency of the voltage doubler 100 to be increased. In addition, the voltage doubler 100 of FIG. 1 may be implemented using standard CMOS technology (without the need of using the more cost intensive triple well CMOS technology).

The above mentioned benefits are due to the use of P-type transistors. In contrast to this, NMOS transistors typically show a significant "body effect" when the source terminal voltages are greater than 0V. The "body effect" leads to an increase in threshold voltage, which leads to an increased switch resistance and to poor operations. PMOS transistors, notably PMOS transistors with proper bulk connections, overcome this effect.

Figure 3:
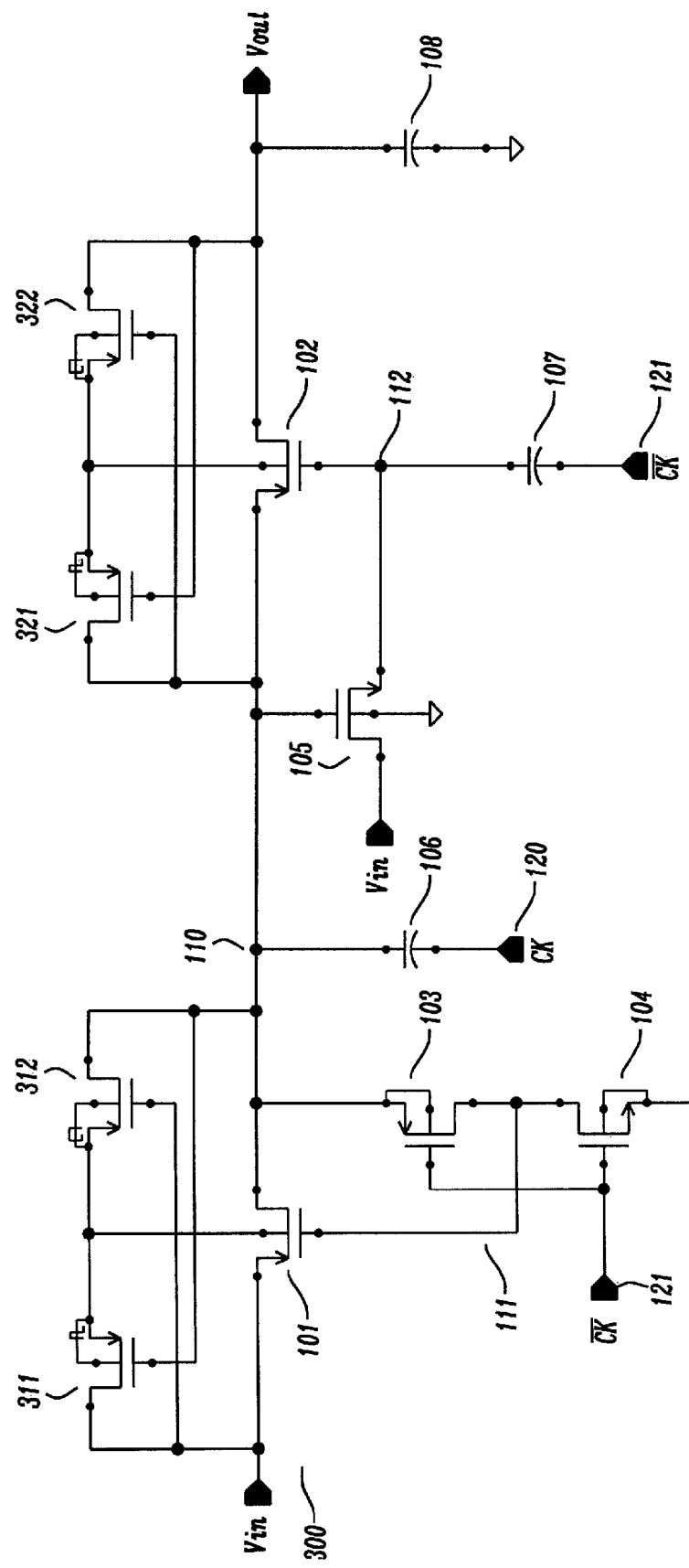
FIG. 3 shows a circuit diagram of an example single stage charge pump voltage doubler comprising additional bulk node connections.

FIG. 3 illustrates an implementation of the voltage doubler 100 using e.g. 0.35 μm CMOS technology without the triple well option. The voltage doubler 300 of FIG. 3 further comprises auxiliary transistors 311, 312 and 321, 322 for the first and second transistors 101, 102, respectively. The auxiliary transistors 311, 312, 321, 322 may be used to provide connections of the bulk of the PMOS parasitic diodes. In other words, the auxiliary transistors 311, 312, 321, 322 may be used to bypass the body diodes of the first and second transistors 101, 102, to further improve the performance of the voltage doubler 100, 300 and to allow for further decreased input voltages Vin. The auxiliary transistors 311, 312, 321, 322 may be used to couple the bulk of the first and second transistors 101, 102 to the source or to the drain of the first and second transistors 101, 102, respectively.

Figure 4:
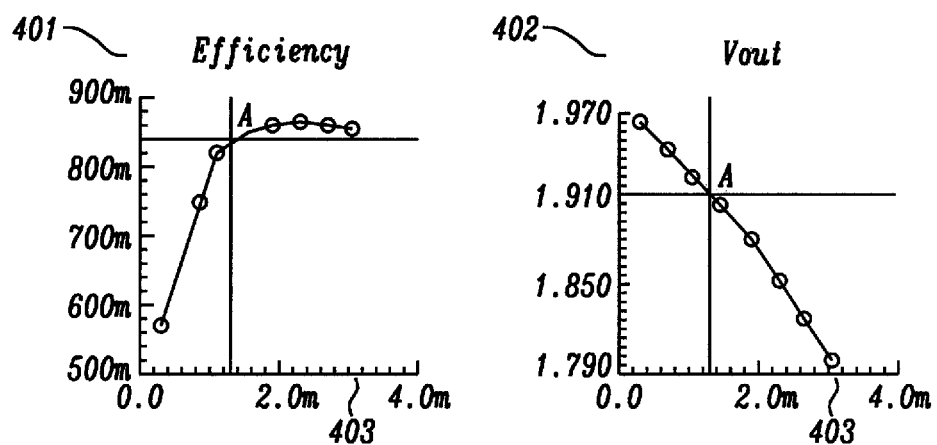
FIG. 4 shows example simulation results of the charge pump circuit of FIG. 3.

FIG. 4 shows example performance results for the voltage doubler 300. In particular, FIG. 4 gives simulation results for an input voltage Vin=1V. The power efficiency 401 and the output voltage Vout 402 are plotted for a sweeping load current $I_{LOAD}$ 403 at the output of the voltage doubler 300. For the simulations, the clock signaling input source is as shown in FIG. 2, i.e. no non-overlapping controls signals 120, 121 were used. However, it has been observed that the described voltage doubler 100, 300 does not show a critical sensitivity with regards to clock signal parameters like the rise time, even when the input voltage is low (e.g. Vin=1V or Vin=1.5V). It was also observed that the charge pump 100, 300 is operational without the need for a dedicated startup circuit. The output voltage (Vout) is typically only limited by the process breakdown voltages of the first and second transistors 101, 102.

As can be seen from FIG. 4, the described voltage doubler 100, 300 provides a power efficiency greater than 80%. Furthermore, the described voltage doubler 100, 300 provides output voltages Vout which are close to two times the input voltage Vin (e.g. greater than 1.9 times the input voltage Vin).

It should be noted that while FIGS. 1 and 3 show a single stage voltage doubler, multiple stages of the voltage doublers 100, 300 may be cascaded, in order to provide further increased output voltages Vout.

Figure 5:
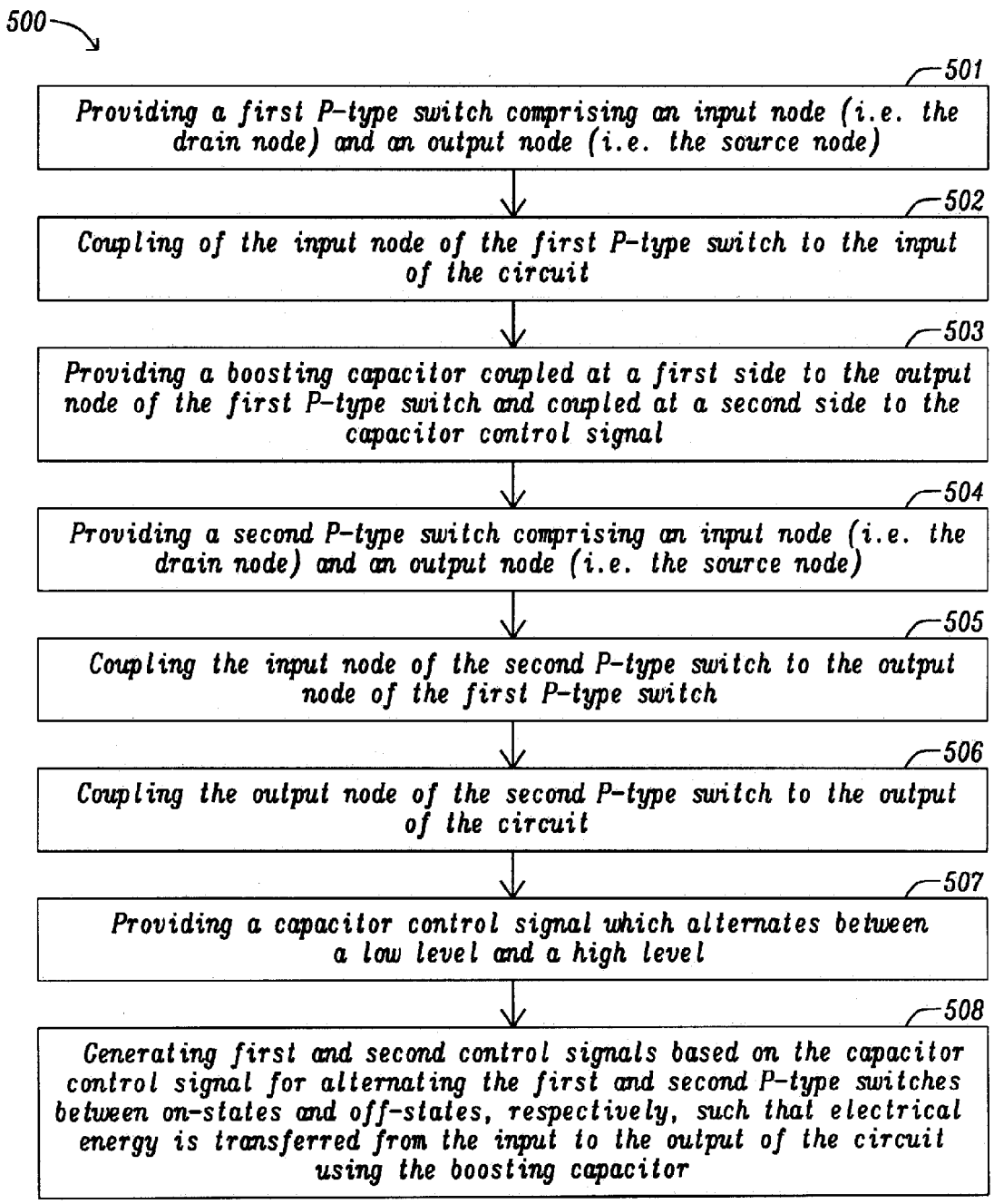
FIG. 5 shows a flow chart of an example method for increasing an input voltage.

FIG. 5 shows a flow chart of an example method for generating an output voltage Vout at an output of the charge pump circuit (or voltage doubler) 100, 300 from an input voltage Vin at an input of the charge pump circuit 100, 300. The level of the output voltage Vout is typically greater than the level of the input voltage Vin. The input of the circuit 100, 300 may be coupled to a power supply which provides electrical power at the input voltage Vin. The method 500 comprises providing 501 a first P-type switch 101 (i.e. the first transistor 101) comprising an input node (i.e. the drain node) and an output node (i.e. the source node) 110. The input node of the first P-type switch 101 is coupled 502 to the input of the circuit 100, 300. Furthermore, the method comprises providing 503 a boosting capacitor 106 coupled at a first side to the output node 110 of the first P-type switch 101 and coupled at a second side to the capacitor control signal 120. In addition, a second P-type switch 102 (i.e. the second transistor) comprising an input node (i.e. the drain node) 110 and an output node (i.e. the source node) is provided 504. The method 500 also comprises coupling 505 the input node 110 of the second P-type switch 102 to the output node 110 of the first P-type switch 101, and coupling 506 the output node of the second P-type switch 102 to the output of the circuit 100, 300. In addition, the method 500 comprises providing 507 a capacitor control signal 120 which alternates between a low level and a high level. The method 500 also comprises generating 508 first and second control signals based on the capacitor control signal 120 for alternating the first and second P-type switches 101, 102 between on-states and off-states, respectively, such that electrical energy is transferred from the input to the output of the circuit 100, 300 using the boosting capacitor 106.

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

What is claimed is:

1. A charge pump circuit configured to generate an output voltage Vout at an output of the circuit from an input voltage Vin at an input of the circuit, wherein a level of the output voltage Vout is greater than a level of the input voltage Vin; wherein the charge pump circuit comprises
    a first P-type switch comprising an input node and an output node; wherein the input node of the first P-type switch is coupled to the input of the circuit;
    a boosting capacitor coupled at a first side to the output node of the first P-type switch and coupled at a second side to a capacitor control signal;
    a second P-type switch comprising an input node and an output node; wherein the input node of the second P-type switch is coupled to the output node of the first P-type switch, and wherein the output node of the second P-type switch is coupled to the output of the circuit; and
    control circuitry configured to provide a capacitor control signal which alternates between a low level and a high level, and configured to generate first and second control signals based on the capacitor control signal for alternating the first and second P-type switches between on-states and off-states, respectively, such that electrical energy is transferred from the input to the output of the circuit using the boosting capacitor; wherein the control circuitry is configured to generate the second control signal, such that the second P-type switch is closed, during a discharging phase, when the capacitor control signal is at high level, to discharge the boosting capacitor towards the output of the circuit; and/or such that the second P-type switch is open, during a charging phase, when the capacitor control signal is at low level; wherein the control circuitry comprises a control capacitor arranged between a gate node of the second P-type switch and an inverted version of the capacitor control signal; and a control switch arranged between a power supply and the gate node of the second P-type switch; wherein the control switch is configured to couple the gate node to the power supply for charging the control capacitor and for closing the second P-type switch; and wherein the control switch is configured to decouple the gate node from the power supply for opening the second P-type switch.

2. The charge pump circuit of claim 1, wherein the first and second control signals are in synchronicity with the capacitor control signal.

3. The charge pump circuit of claim 1, wherein the first and second control signals are applied to gate nodes of the first and second P-type switches, respectively.

4. The charge pump circuit of claim 1, wherein
    the high level of the capacitor control signal corresponds to the level of the input voltage Vin; and
    the low level of the capacitor control signal corresponds to the level of ground.

5. The charge pump circuit of claim 1, wherein the control circuitry is configured to generate the first control signal, such that
    the first P-type switch is closed, during a charging phase, when the capacitor control signal is at low level, to charge the boosting capacitor from the input of the circuit; and/or
    the first P-type switch is open, during a discharging phase, when the capacitor control signal is at high level.

6. The charge pump circuit of claim 5, wherein the control circuitry comprises
    a high side switch and a low side switch which are arranged in series between the output node of the first P-type switch and ground; and
    a midpoint between the high side switch and the low side switch is coupled to a gate node of the first P-type switch; wherein the high side switch is configured to couple the output node with the gate node of the first P-type switch, when the high side switch is closed, to open the first P-type switch; and wherein the low side switch is configured to couple the gate node of the first P-type switch to ground, when the low side switch is closed, to close the first P-type switch.

7. The charge pump circuit of claim 5, wherein the control circuitry is configured to open and close the high side switch and the low side switch in a mutually exclusive manner.

8. The charge pump circuit of claim 5, wherein
    the high side switch comprises a P-type switch;
    the low side switch comprises a N-type switch; and
    gates nodes of the high side switch and of the low side switch are coupled to an inverted version of the capacitor control signal.

9. The charge pump circuit of claim 1, wherein
    a. the control switch comprises an N-type switch; and
    b. a gate node of the control switch is coupled to the output node of the first P-type switch.

10. The charge pump circuit of claim 1, wherein the first and second P-type switches are P-type metal oxide semiconductor transistors.

11. The charge pump circuit of claim 1, further comprising auxiliary switches for bypassing parasitic diodes of the first and second P-type switches, respectively.

12. The charge pump circuit of claim 1, further comprising an output capacitor in parallel to the output of the circuit.

13. A method for generating an output voltage Vout at an output of a charge pump circuit from an input voltage Vin at an input of the charge pump circuit, wherein a level of the output voltage Vout is greater than a level of the input voltage Vin; wherein the method comprises
   a. providing a first P-type switch comprising an input node and an output node;
   b. coupling the input node of the first P-type switch to the input of the circuit;
   c. providing a boosting capacitor coupled at a first side to the output node of the first P-type switch and coupled at a second side to a capacitor control signal;
   d. providing a second P-type switch comprising an input node and an output node;
   e. coupling the input node of the second P-type switch to the output node of the first P-type switch;
   f. coupling the output node of the second P-type switch to the output of the circuit;
   g. providing a capacitor control signal which alternates between a low level and a high level; and
   h. generating first and second control signals based on the capacitor control signal for alternating the first and second P-type switches between on-states and off-states, respectively, such that electrical energy is transferred from the input to the output of the circuit using the boosting capacitor; wherein the second control signal is generated such that the second P-type switch is closed, during a discharging phase, when the capacitor control signal is at high level, to discharge the boosting capacitor towards the output of the circuit; and/or such that the second P-type switch is open, during a charging phase, when the capacitor control signal is at low level; wherein the second control signal is generated using a control capacitor arranged between a gate node of the second P-type switch and an inverted version of the capacitor control signal; and using a control switch arranged between a power supply and the gate node of the second P-type switch; wherein the control switch is configured to couple the gate node to the power supply for charging the control capacitor and for closing the second P-type switch; and wherein the control switch is configured to decouple the gate node from the power supply for opening the second P-type switch.

14. The method of claim 13 wherein transferring the electrical energy from input to output comprises doubling the voltage.

15. The method of claim 13 wherein the control circuitry opens and closes the first P-type switch and the second P-type switch in a mutually exclusive manner.

16. The method of claim 13 wherein said first control signal and second control signal are synchronized with the capacitor control signal.

17. The method of claim 13 wherein the control circuitry generates the first control signal, such that
   a. the first P-type switch is closed, during a charging phase, when the capacitor control signal is at low level, to charge the boosting capacitor from the input of the circuit; and/or
   b. the first P-type switch is open, during a discharging phase, when the capacitor control signal is at high level.

18. The method of claim 13 further comprising reducing the body effect utilizing said first P-type switch and said second P-type switch.

19. The method of claim 18 wherein said further comprising reducing the body effect utilizing said first P-type switch and said second P-type switch provides an increased power efficiency.

20. The method of claim 13 wherein said charge pump circuit comprises auxiliary switches for bypassing parasitic diodes of the first and second P-type switches, wherein the auxiliary switches comprise P-type MOS transistors.

21. The method of claim 20 wherein said charge pump circuit with auxiliary switches discharges current through said parasitic diodes of said first and second P-type switches for improving the power efficiency.

22. The method of claim 19 wherein said charge pump circuit with auxiliary switches bypassing said parasitic diodes of said first and second P-type switches reducing said input voltages Vin.

* * * * *